US011707918B2

(12) United States Patent
Salter et al.

(10) Patent No.: US 11,707,918 B2
(45) Date of Patent: Jul. 25, 2023

(54) RADIANT PANEL

(71) Applicant: Ford Global Technologies, LLC, Dearborn, MI (US)

(72) Inventors: Stuart C. Salter, White Lake, MI (US); Katherine Howard-Cone, Canton, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 17/011,410

(22) Filed: Sep. 3, 2020

(65) Prior Publication Data
US 2022/0063244 A1   Mar. 3, 2022

(51) Int. Cl.
*B32B 9/00* (2006.01)
*B32B 3/26* (2006.01)
*B32B 9/04* (2006.01)
*B32B 7/027* (2019.01)
*B32B 7/025* (2019.01)
(Continued)

(52) U.S. Cl.
CPC .............. *B32B 9/007* (2013.01); *B32B 3/263* (2013.01); *B32B 7/025* (2019.01); *B32B 7/027* (2019.01); *B32B 9/045* (2013.01); *B60R 13/02* (2013.01); *B60R 16/03* (2013.01); *B32B 2307/202* (2013.01); *B32B 2307/302* (2013.01); *B32B 2307/304* (2013.01); *B32B 2605/003* (2013.01); *B60R 13/0815* (2013.01); *B60R 13/0869* (2013.01); *B60R 16/037* (2013.01)

(58) Field of Classification Search
CPC ......... B32B 9/007; B32B 7/025; B32B 7/027; B32B 3/263; B32B 9/045; B32B 2307/202; B32B 2307/302; B32B 2307/304; B32B 2605/003; B60R 13/02; B60R 13/0815; B60R 13/0869; B60R 16/03; B60R 16/037
See application file for complete search history.

(56) References Cited

U.S. PATENT DOCUMENTS 8,025,959 B2   9/2011   Hashiba et al.
8,524,622 B2   9/2013   Akaike et al.
(Continued)

FOREIGN PATENT DOCUMENTS

WO   WO-2018106793 A1 *  6/2018  ............. B32B 13/04

*Primary Examiner* — Catherine A. Simone
(74) *Attorney, Agent, or Firm* — Vichit Chea; Price Heneveld LLP

(57) ABSTRACT

A radiant panel includes a surface layer that is thermally conductive and includes exterior and interior surfaces. A first interior layer is electrically conductive and includes exterior and interior surfaces. The exterior surface of the first interior layer and the interior surface of the surface layer are coupled to one another. A second interior layer includes thermally insulative properties and a first rigidity. The second interior layer includes exterior and interior surfaces. The exterior surface of the second interior layer and the interior surface of the first interior layer are coupled to one another. A third interior layer includes thermally insulative properties and a second rigidity. The third interior layer includes exterior and interior surfaces. The exterior surface of the third interior layer and the interior surface of the second interior layer are coupled to one another. The second rigidity is greater than the first rigidity.

21 Claims, 7 Drawing Sheets

(51) Int. Cl.
    *B60R 13/08*     (2006.01)
    *B60R 16/03*     (2006.01)
    *B60R 13/02*     (2006.01)
    *B60R 16/037*     (2006.01)

(56) References Cited

U.S. PATENT DOCUMENTS

| | | |
|---|---|---|
| 9,022,464 B2 | 5/2015 | Feng et al. |
| 9,637,035 B2 | 5/2017 | Abe et al. |
| 2008/0142494 A1 | 6/2008 | Blake et al. |
| 2016/0135253 A1 | 5/2016 | Tomovic et al. |

\* cited by examiner

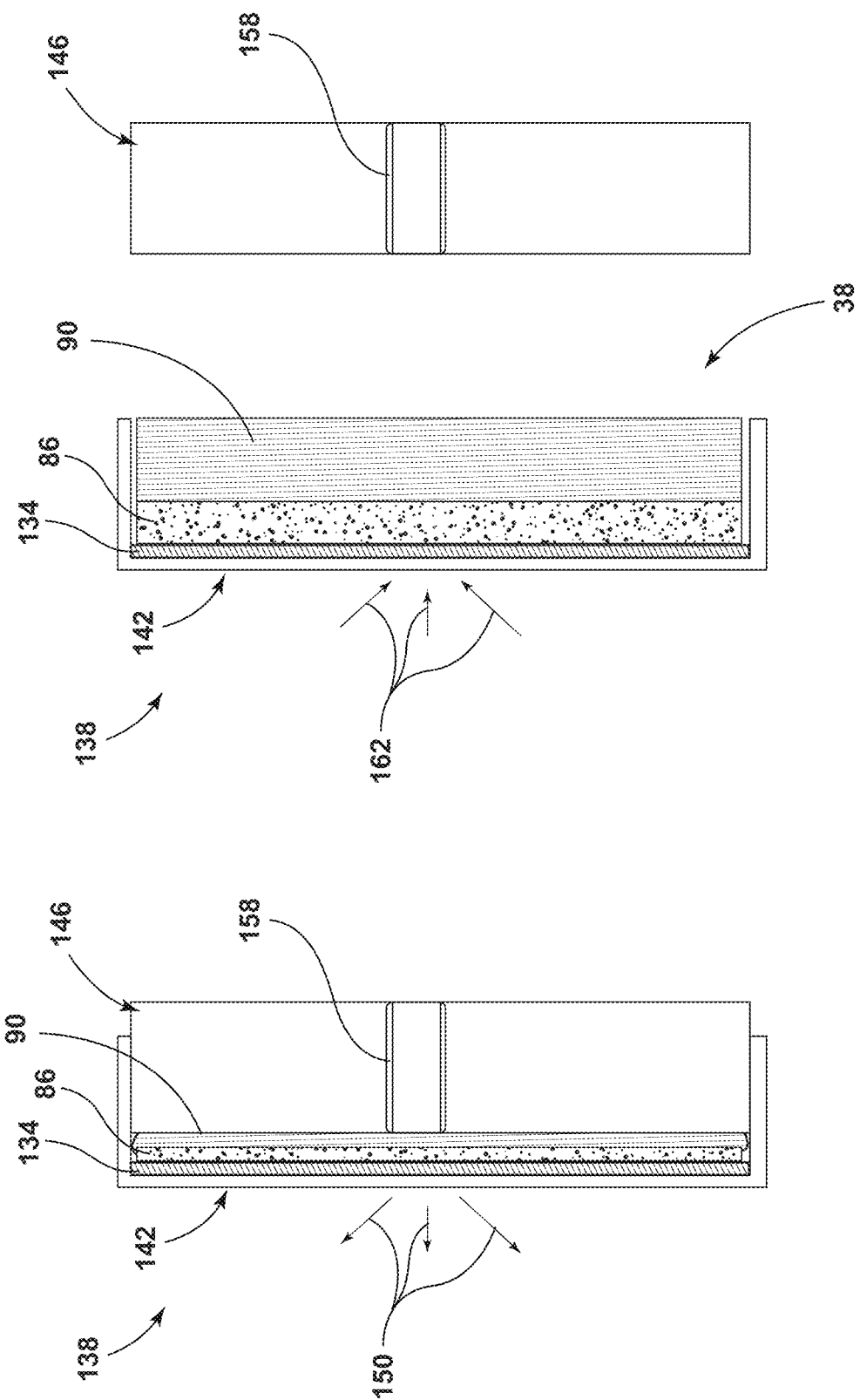

ively used in obtaining an individual climate zone.

RADIANT PANEL

FIELD OF THE DISCLOSURE

The present disclosure generally relates to a panel. More specifically, the present disclosure relates to a radiant panel.

BACKGROUND OF THE INVENTION

Consumers are ever on the lookout for improved comfort features in the products they purchase. One such comfort feature is providing a consumer with the ability to create an individual climate zone. Accordingly, the present disclosure provides a panel, such as a radiant panel, that may be utilized in obtaining an individual climate zone.

SUMMARY OF THE INVENTION

According to a first aspect of the present disclosure, a radiant panel includes a surface layer, a first interior layer, a second interior layer, and a third interior layer. The surface layer is thermally conductive and includes an exterior surface and an interior surface. The first interior layer is electrically conductive and includes an exterior surface and an interior surface. The exterior surface of the first interior layer and the interior surface of the surface layer are coupled to one another. The second interior layer includes thermally insulative properties and a first rigidity. The second interior layer includes an exterior surface and an interior surface. The exterior surface of the second interior layer and the interior surface of the first interior layer are coupled to one another. The third interior layer includes thermally insulative properties and a second rigidity. The third interior layer includes an exterior surface and an interior surface. The exterior surface of the third interior layer and the interior surface of the second interior layer are coupled to one another. The second rigidity is greater than the first rigidity.

Embodiments of the first aspect of the disclosure can include any one or a combination of the following features:
- the first interior layer receives electrical energy from a power source;
- the electrical energy received by the first interior layer is converted into thermal energy, wherein the thermal energy is transmitted from the interior surface of the surface layer to the exterior surface of the surface layer;
- the insulative properties of the second interior layer and the third interior layer inhibit the thermal energy generated at the first interior layer from being transferred to the second interior layer and the third interior layer;
- the insulative properties of the second interior layer and the third interior layer provide a directional preference for dissipation of the thermal energy such that greater than 50% of the thermal energy generated at the first interior layer is transferred to the surface layer;
- the surface layer is electrically insulative;
- the surface layer has a thickness in the range of greater an zero millimeters and less than about one millimeter;
- one or more channels provided in the surface layer;
- the surface layer includes boron nitride;
- the surface layer includes boron nitride at a concentration between about 1% by weight of the surface layer to about 10% by weight of the surface layer;
- a thermal conductivity of the surface layer is between about 0.30 watt per meter-kelvin (W/(mK)) to about 0.50 watt per meter-kelvin (W/(mK));
- the first interior layer includes carbon nanostructures and graphene;
- the graphene within the first interior layer is present at a concentration of between about 1% by weight of the first interior layer to about 7% by weight of the first interior layer;
- the carbon nanostructures within the first interior layer are present at a concentration of between about 1% by weight of the first interior layer and about 5% by weight of the first interior layer; and
- the surface layer is a user-proximate surface within a cabin of a vehicle.

According to a second aspect of the present disclosure, a radiant panel includes a surface layer, a first interior layer, a second interior layer, and a third interior layer. The surface layer is thermally conductive and includes an exterior surface and an interior surface. The surface layer includes boron nitride at a concentration of between about 1% by weight of the surface layer and about 10% by weight of the surface layer. A thickness of the surface layer is in the range of greater than zero millimeters and less than about one millimeter. The first interior layer is electrically conductive and receives electrically energy from a power source. The first interior layer includes an exterior surface and an interior surface. The exterior surface of the first interior layer and the interior surface of the surface layer are coupled to one another. The first interior layer includes carbon nanostructures and graphene. The carbon nanostructures are present in the first interior layer at a concentration of between about 1% by weight of the first interior layer and about 5% by weight of the first interior layer. The graphene is present in the first interior layer at a concentration of between about 1% by weight of the first interior layer and about 7% by weight of the first interior layer. The second interior layer includes thermally insulative properties and a first rigidity. The second interior layer includes an exterior surface and an interior surface. The exterior surface of the second interior layer and the interior surface of the first interior layer are coupled to one another. The third interior layer includes thermally insulative properties and a second rigidity. The third interior layer includes an exterior surface and an interior surface. The exterior surface of the third interior layer and the interior surface of the second interior layer are coupled to one another. The second rigidity is greater than the first rigidity.

Embodiments of the second aspect of the present disclosure can include any one or a combination of the following features:
- a thermal conductivity of the surface layer is between about 0.30 watt per meter-kelvin (W/(mK)) to about 0.50 watt per meter-kelvin (W/(mK));
- the surface layer is electrically insulative;
- one or more channels provided in the surface layer;
- the electrical energy received by the first interior layer is converted into thermal energy, wherein the thermal energy is transmitted from the interior surface of the surface layer to the exterior surface of the surface layer; and
- the insulative properties of the second interior layer and the third interior layer inhibit the thermal energy generated at the first interior layer from being transferred to the second interior layer and the third interior layer, and wherein the insulative properties of the second interior layer and the third interior layer provide a directional preference for dissipation of the thermal energy such that greater than 50% of the thermal energy generated at the first interior layer is transferred to the surface layer.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5C is a schematic view of the tool that may be utilized in the molding process of producing the radiant panel, illustrating a third stage of the molding process, according to one aspect;

FIG. 5D is a schematic view of the tool that may be utilized in the molding process of producing the radiant panel, illustrating a fourth stage of the molding process, according to one aspect.

DETAILED DESCRIPTION OF THE PREFERRED EMBODIMENTS

Figure 1:
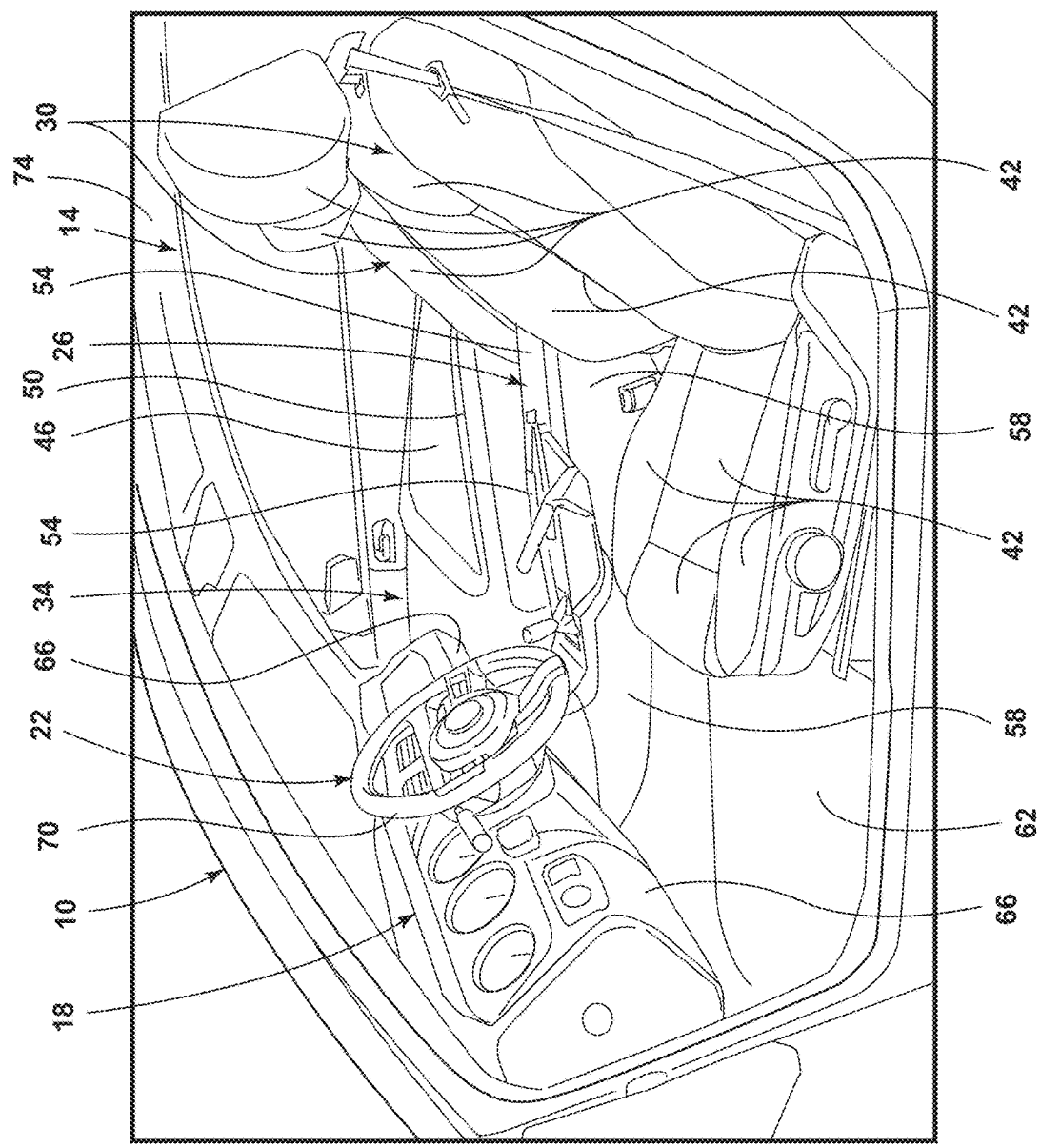
FIG. 1 is a side perspective view of a cabin of a vehicle, illustrating various components of the vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a radiant panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a vehicle 10 includes a cabin 14, or interior, of the vehicle 10. In various examples, the vehicle 10 may be a motor vehicle (e.g., an automobile, an aircraft, a marine vehicle, etc.). While the vehicle 10 may be a motor vehicle, the vehicle 10 need not be powered by an internal combustion engine. Rather, the motor vehicle may be powered by alternative energy sources, such as those utilized in fuel cell vehicles, battery electric vehicles, plug-in vehicles, hybrid electric vehicles, and so on. The cabin 14 of the vehicle 10 may be provided with an instrument panel 18, a steering wheel 22, a center console 26, one or more seating assemblies 30, and/or one or more doors 34.

Figure 2:
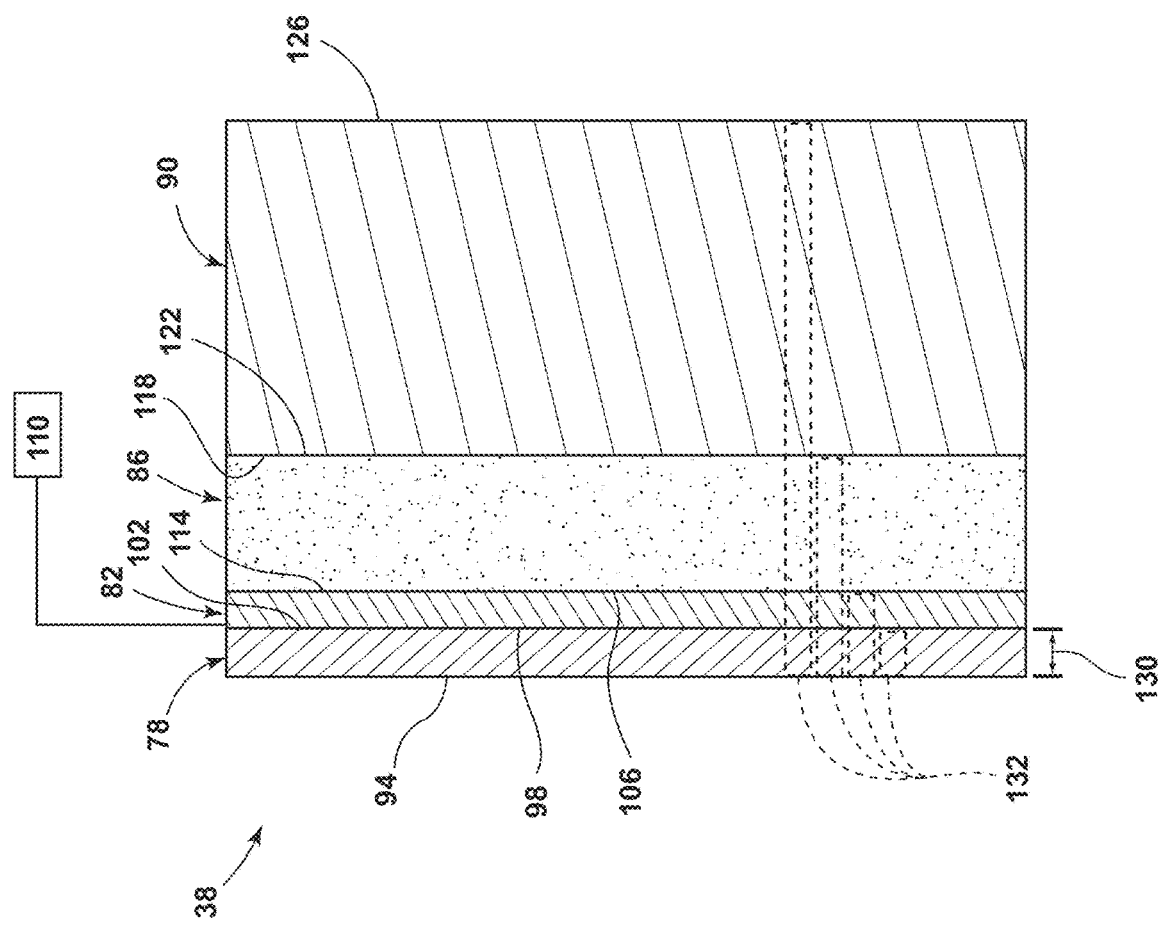
FIG. 2 is a diagrammatic representation of a radiant panel, illustrating an arrangement of various layers of the radiant panel.

Referring now to FIGS. 1-2, a radiant panel 38 may be provided at one or more locations within the cabin 14 of the vehicle 10. The radiant panel 38 may enable an individualization of a local climate within the cabin 14 for individual occupants of the vehicle 10. Accordingly, suitable locations for the radiant panel 38 within the cabin 14 of the vehicle 10 may include, but are not limited to regions of the cabin 14 that are typically adjacent to an occupant of the vehicle 10. For example, the areas that may be adjacent to an occupant of the vehicle 10 may include various surfaces 42 of the seating assemblies 30 (e.g., surfaces of the seat, seatback, and/or headrest), trim panels 46 on the doors 34, armrests 50 on the doors 34, upper surfaces 54 and/or side surfaces 58 of the center console 26, a floorboard region 62, an underside 66 of the instrument panel 18, a handle portion 70 of the steering wheel 22, and/or a headliner 74 positioned on an interior surface of a roof of the vehicle 10.

Referring again to FIGS. 1-2, the radiant panel 38 includes a surface layer 78, a first interior layer 82, a second interior layer 86, and/or a third interior layer 90. In various examples, the surface layer 78 is a user-proximate surface within the cabin 14 of the vehicle 10. The surface layer 78 includes an exterior surface 94 and an interior surface 98. In various examples, the surface layer 78 is thermally conductive. The terms exterior surface and interior surface as used herein are intended to denote proximity of the given surface to an occupant of the vehicle 10 and/or denote an arrangement of the various layers for a given component of the vehicle 10 that is provided with the radiant panel 38. Accordingly, the terms exterior surface and interior surface are not intended to be limiting, rather, the terms exterior surface and interior surface of the various layers of the radiant panel 38 are intended to aid in understanding and orientation of the various layers within the radiant panel 38 as they relate to a user of the radiant panel 38. For example, the exterior surface 94 of the surface layer 78 may be a surface of the radiant panel 38 that is nearest to the user or occupant of the vehicle 10. Therefore, in one specific example, when the radiant panel 38 is utilized within one of the trim panels 46 on the doors 34, the exterior surface 94 of the surface layer 78 is positioned proximate to, or nearest, the user of the radiant panel 38 while the third interior layer 90 may be positioned distal to, or furthest from, the user. The first interior layer 82 includes an exterior surface 102 and an interior surface 106.

Referring further to FIGS. 1-2, the exterior surface 102 of the first interior layer 82 and the interior surface 98 of the surface layer 78 are coupled to one another. The first interior layer 82 is electrically conductive. In various examples, the first interior layer 82 is electrically coupled to a power source 110. In various examples, the power source 110 may be an onboard battery of the vehicle 10. The second interior layer 86 includes an exterior surface 114 and an interior surface 118. The exterior surface 114 of the second interior layer 86 and the interior surface 106 of the first interior layer 82 are coupled to one another. The second interior layer 86 has insulative properties and a first rigidity or hardness. The third interior layer 90 includes an exterior surface 122 and an interior surface 126. The exterior surface 122 of the third interior layer 90 and the interior surface 118 of the second interior layer 86 are coupled to one another. The third interior layer 90 has thermally insulative properties and a second rigidity or hardness. In various examples, the second rigidity or hardness may be greater than the first rigidity or hardness. Accordingly, the third interior layer 90 may be stiffer than the second interior layer 86. Providing the second interior layer 86 as softer than the third interior layer 90 may enable the radiant panel 38 to provide an overall softer or suppler feel to a user. In some examples, the thermal insulative properties of the second interior layer 86 and the thermal insulative properties of the third interior layer 90 may differ (e.g. one may be greater than the other). In various examples, the third interior layer 90 may be an interior-most layer of the radiant panel 38. Accordingly, the interior surface 126 of the third interior layer 90 may alternatively be referred to as a "B" surface and the exterior surface 94 of the surface layer 78 may be referred to as an "A" surface.

Referring still further to FIGS. 1-2, the first interior layer 82 can receive electrical energy from the power source 110. The electrical energy received by the first interior layer 82 from the power source 110 may be converted into thermal energy. The thermal energy may be transmitted from the interior surface 98 of the surface layer 78, which is in direct contact with the exterior surface 102 of the first interior layer 82, to the exterior surface 94 of the surface layer 78. In various examples, the insulative properties of the second interior layer 86 and/or the third interior layer 90 may inhibit the thermal energy generated at the first interior layer 82 from being transferred to the second interior layer 86 and/or the third interior layer 90. In various examples, the insulative properties of the second interior layer 86 and/or the third interior layer 90 may provide a directional preference for dissipation of the thermal energy generated at the first interior layer 82 such that greater than 50% of the thermal energy generated at the first interior layer 82 is transferred to the surface layer 78. For example, greater than about 50% of the thermal energy generated at the first interior layer 82 may be transferred to the surface layer 78, greater than about 60% of the thermal energy generated at the first interior layer 82 may be transferred to the surface layer 78, greater than about 70% of the thermal energy generated at the first interior layer 82 may be transferred to the surface layer 78, greater than about 80% of the thermal energy generated at the first interior layer 82 may be transferred to the surface layer 78, greater than about 90% of the thermal energy generated at the first interior layer may be transferred to the surface layer 78, and/or combinations or ranges thereof. In some examples, the surface layer 78 may be electrically insulative. It may be beneficial for the surface layer 78 to have at least a degree of electrical insulative properties such that the electrical current provided to the first interior layer 82 by the power source 110 is discouraged or prevented from discharging to the user by way of the surface layer 78.

Referring again to FIGS. 1-2, in some examples the surface layer 78 has a thickness 130 in the range of greater than 0 mm and less than about 1 mm. For example, the surface layer 78 may have a thickness 130 that is greater than 0 mm, about 0.1 mm, about 0.2 mm, about 0.3 mm, about 0.4 mm, about 0.5 mm, about 0.6 mm, about 0.7 mm, about 0.8 mm, about 0.9 mm, about 1 mm, and/or combinations or ranges thereof. In various examples, the surface layer 78 may be provided with one or more channels 132. The channels 132 within the surface layer 78 may aid the surface layer 78 in contouring to various features of the vehicle 10 to which the radiant panel 38 is applied. It is contemplated that more than one of the layers of the radiant panel 38 may be provided with the channels 132 to further aid in contouring the radiant panel 38 to a given component within the cabin 14 of the vehicle 10. Additionally or alternatively, the channels 132 may be utilized to receive components of the cabin 14 of the vehicle 10. In such an example, the channels 132 may serve as the female portion of a male-female coupling of the components and thermal energy generated at the radiant panel 38 may be transferred along the coupled component to a region of the cabin 14 that is remote, or distanced, from the radiant panel 38. A composition of the surface layer 78 may include boron nitride. In such examples, the surface layer 78 may include boron nitride at a concentration between about 1% by weight of the surface layer 78 to about 10% by weight of the surface layer 78. For example, the surface layer 78 may include boron nitride at a concentration of about 1% by weight of the surface layer 78, about 2% by weight of the surface layer 78, about 3% by weight of the surface area 78, about 4% by weight of the surface layer 78, about 5% by weight of the surface layer 78, about 6% by weight of the surface layer 78, about 7% by weight of the surface layer 78, about 8% by weight of the surface layer 78, about 9% by weight of the surface layer 78, about 10% by weight of the surface layer 78, and/or combinations or ranges thereof.

Referring further to FIGS. 1-2, a thermal conductivity of the surface layer 78 may be between about 0.30 watt per meter-kelvin (W/(mK)) to about 0.50 watt per meter-kelvin (W/(mK)). For example, the thermal conductivity of the surface layer 78 may be about 0.30 watt per meter-kelvin (W/(mK)), about 0.35 watt per meter-kelvin (W/(mK)), about 0.40 watt per meter-kelvin (W/(mK)), about 0.45 watt per meter-kelvin (W/(mK)), and/or about 0.50 watt per meter-kelvin (W/(mK)). In some examples, a composition of the first interior layer 82 includes carbon nanostructures and graphene. In various examples, the graphene within the first interior layer 82 is present at a concentration of between about 1% by weight of the first interior layer 82 to about 7% by weight of the first interior layer 82. For example, the concentration of graphene within the first interior layer 82 may be about 1% by weight of the first interior layer 82, about 2% by weight of the first interior layer 82, about 3% by weight of the first interior layer 82, about 4% by weight of the first interior layer 82, about 5% by weight of the first interior layer 82, about 6% by weight of the first interior layer 82, about 7% by weight of the first interior layer 82. In various examples, the carbon nanostructures within the first interior layer 82 may be present at a concentration between about 1% by weight of the first interior layer 82 and about 5% by weight of the first interior layer 82. For example, the carbon nanostructures within the first interior layer 82 may be present at a concentration of about 1% by weight of the first interior layer 82, about 2% by weight of the first interior layer 82, about 3% by weight of the first interior layer 82, about 4% by weight of the first interior layer 82, and/or about 5% by weight of the first interior layer 82.

Figure 3:
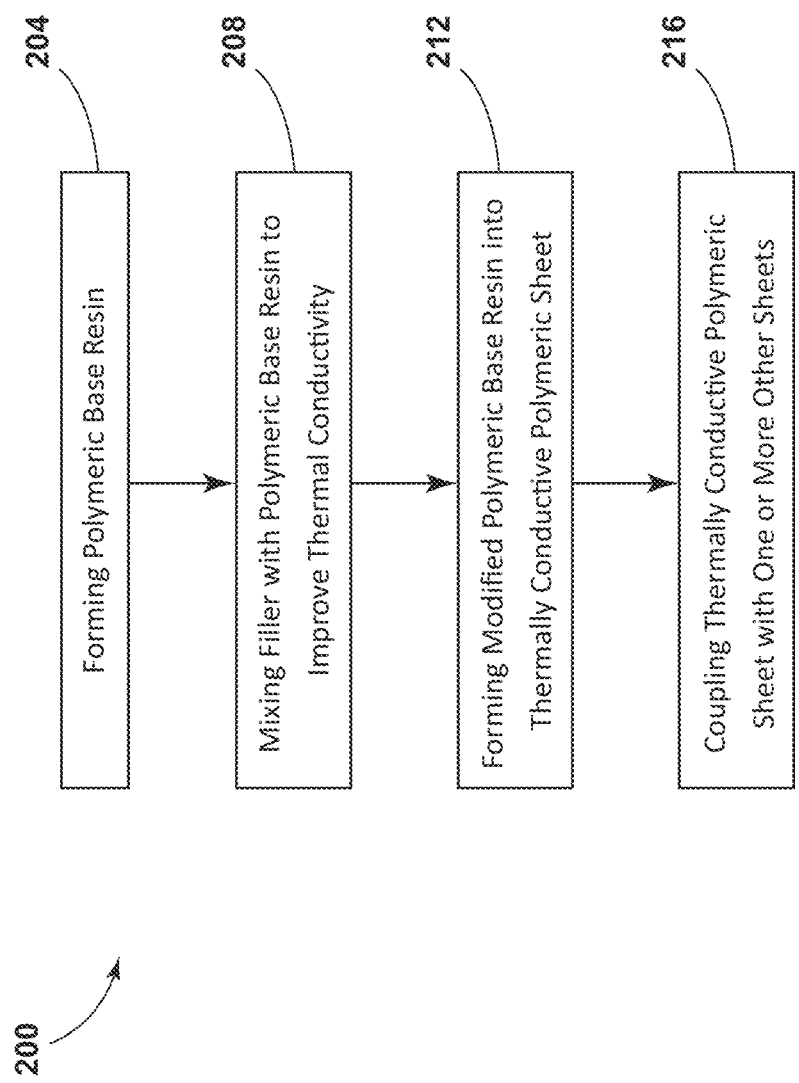
FIG. 3 is a flow diagram of a method of producing the radiant panel, according to one aspect.

Referring now to FIG. 3, a method 200 of producing the radiant panel 38 is shown according to one example. The method 200 of producing the radiant panel 38 can include step 204 of forming a polymeric base resin. The step 204 of forming the polymeric base resin may include melting a polymeric precursor material. For example, the polymeric precursor material may be polymer pellets. In various examples, the polymeric precursor material may be nylon, polyester, vinyl, polypropylene, or any other suitable polymer, including combinations of polymers. The method 200 of producing the radiant panel 38 may include step 208 of mixing a filler with the polymeric base resin to improve a thermal conductivity of the polymeric base resin. Once the filler to improve the thermal conductivity of the polymeric base resin has been mixed with the polymeric base resin at step 208, the resin may be referred to as a thermally conductive polymeric resin. The filler that improves the thermal conductivity of the polymeric base resin may be a ceramic material or a ceramic filler. For example, the ceramic material or ceramic filler utilized to improve the thermal conductivity of the polymeric base resin at step 208 may be boron nitride, aluminum oxide, titanium oxide, and/or combinations thereof. However, the present disclosure is not limited to the aforementioned ceramic materials or ceramic fillers. Rather, it is contemplated that alternative materials or fillers may be utilized, including those that are not ceramic in composition, to improve the thermal conductivity of the polymeric base resin. The step 208 of mixing a filler with the polymeric base resin to improve thermal conductivity may include adding a concentration of the filler that is sufficient to improve the thermal conductivity of the polymeric base resin. For example, the thermal conductivity of the polymeric base resin following the addition of the filler at step 208, at which point the polymeric base resin may be referred to as a thermally conductive polymeric base resin, may be in the range of between about 0.30 watt per meter-kelvin (W/(mK)) to about 0.50 watt per meter-kelvin (W/(mK)). The thermally conductive polymeric resin created or formed at step 208 may be a precursor of the surface layer 78 of the radiant panel 38. The addition of the ceramic material or ceramic filler to the polymeric base resin at step 208 may provide the ceramic material or ceramic filler at a concentration of between about 1% by weight of the surface layer 78 to about 10% by weight of the surface layer 78. After formation of the thermally conductive polymeric resin at step 208, the method 200 can include step 212 of forming the modified polymeric base resin (e.g., the thermally conductive polymeric resin) into a thermally conductive polymeric sheet. The formation of the modified polymeric base resin into a thermally conductive polymeric sheet at step 212 of method 200 may be accomplished, for example, by extrusion, injection molding, injection compression molding, or any other suitable process, including combinations thereof. Once the thermally conductive polymeric sheet has been formed at step 212, the method 200 may proceed to step 216 of coupling the thermally conductive polymeric sheet with one or more other sheets to form the radiant panel 38. In various examples, the step 216 of coupling the thermally conductive polymeric sheet with one or more other sheets to form the radiant panel 38 may be accomplished through a lamination process, a molding process, or any other suitable process. For example, when lamination processes are utilized, the lamination may be accomplished by way of a flame laminator, hot lamination, adhesives lamination, and/or combinations thereof. In examples that employ a molding process, injection compression molding may be utilized or conventional injection molding may be utilized.

Figure 4:
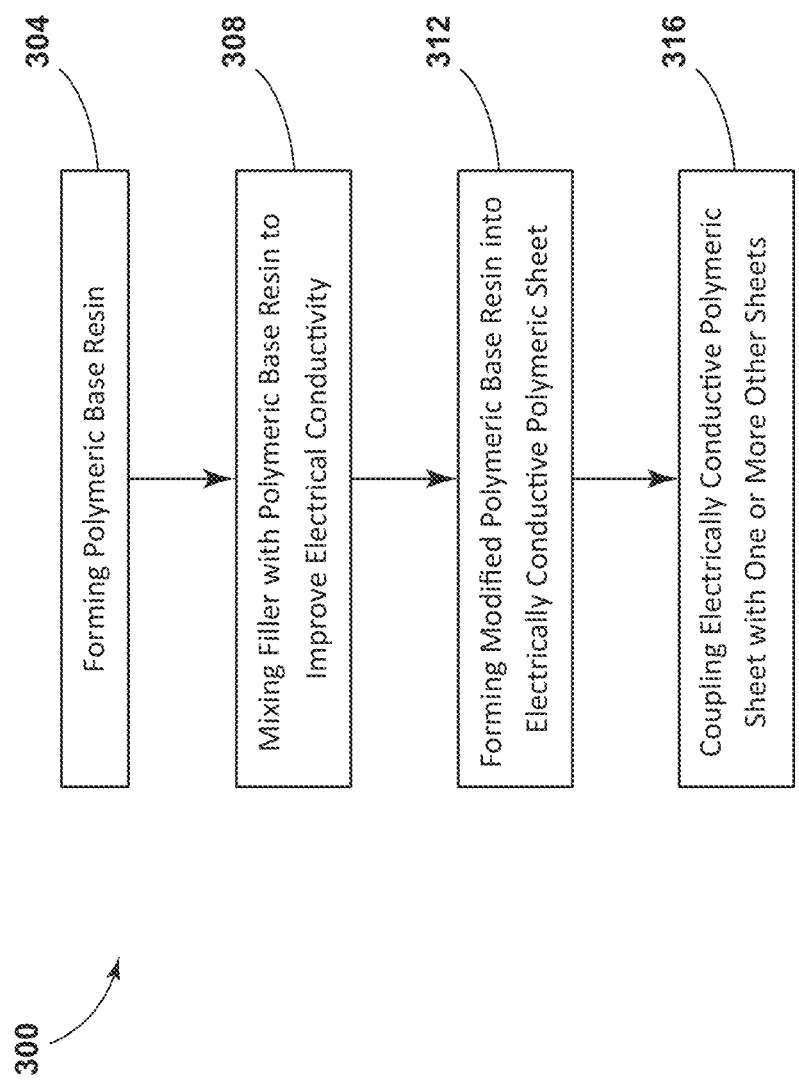
FIG. 4 is a flow diagram of a method of producing the radiant panel, according to another aspect.

Referring to FIG. 4, method 300 of producing the radiant panel 38 can include step 304 of forming a polymeric base resin. The step 304 of forming the polymeric base resin may include melting a polymeric precursor material. For example, the polymeric precursor material may be polymer pellets. In various examples, the polymeric precursor material may be nylon, polyester, vinyl, polypropylene, or any other suitable polymer including combinations of polymers. The method 300 of producing the radiant panel 38 can include step 308 of mixing a filler with the polymeric base resin to improve electrical conductivity of the polymeric base resin. Once the step 308 has been utilized to improve the electrical conductivity of the polymeric base resin, the modified polymeric base resin may be referred to as an electrically conductive polymeric resin. Accordingly, the filler added or mixed with the polymeric base resin at step 308 is added in a concentration sufficient to improve electrical conductivity of the polymeric base resin. The filler mixed or added with the polymeric base resin to improve electrical conductivity may include carbon nanostructures, graphene, and/or any other suitable filler for improving electrical conductivity, including combinations of fillers. In examples that employ the carbon nanostructures, the carbon nanostructures may be added to the polymeric base resin at a concentration of between about 1% by weight of the polymeric base resin and about 5% by weight of the polymeric base resin. In examples that utilize graphene, the graphene may be present at a concentration of between about 1% by weight of the polymeric base resin to about 7% by weight of the polymeric base resin. Once the polymeric base resin has been modified, the method 300 of producing the radiant panel 38 may proceed to step 312 of forming the modified polymeric base resin into an electrically conductive polymeric sheet. The electrically conductive polymeric sheet formed at step 312 of method 300 may be utilized as the first interior layer 82 of the radiant panel 38. Accordingly, the carbon nanostructures may be present in the first interior layer 82 at a concentration of between about 1% by weight of the first interior layer 82 to about 5% by weight of the first interior layer 82. Similarly, in examples that utilize graphene, the graphene may be present in the first interior layer 82 at a concentration of between about 1% by weight of the first interior layer 82 to about 7% by weight of the first interior layer 82. After the electrically conductive polymeric sheet has been formed at step 312, the electrically conductive polymeric sheet may be coupled with one or more other sheets at step 316. For example, the electrically conductive polymeric sheet may be coupled to the thermally conductive polymeric sheet to form the surface layer 78 and the first interior layer 82 of the radiant panel 38.

Figure 5B:
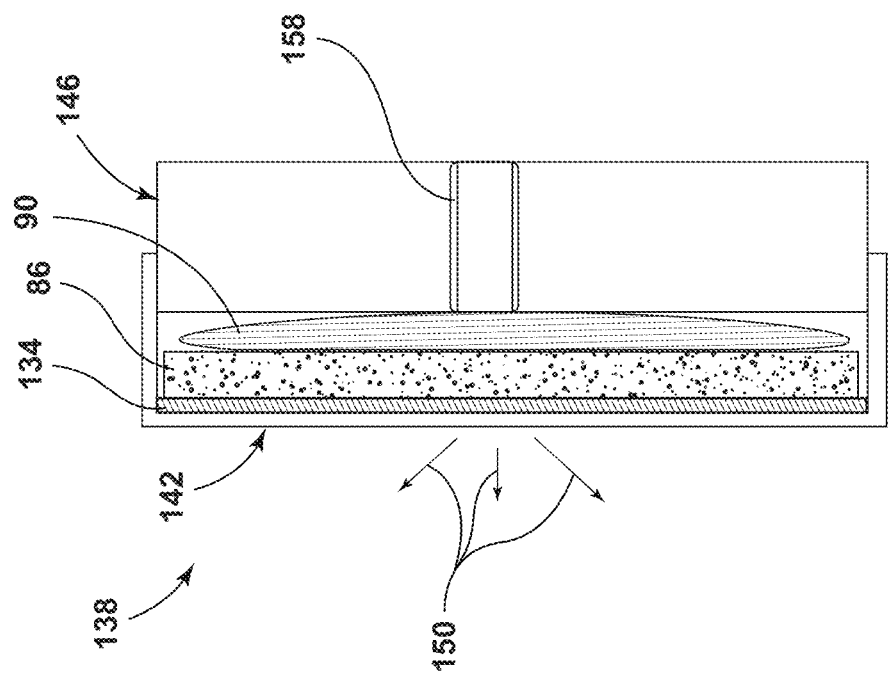
FIG. 5B is a schematic view of the tool that may be utilized in the molding process of producing the radiant panel, illustrating a second stage of the molding process, according to one aspect.
Figure 5A:
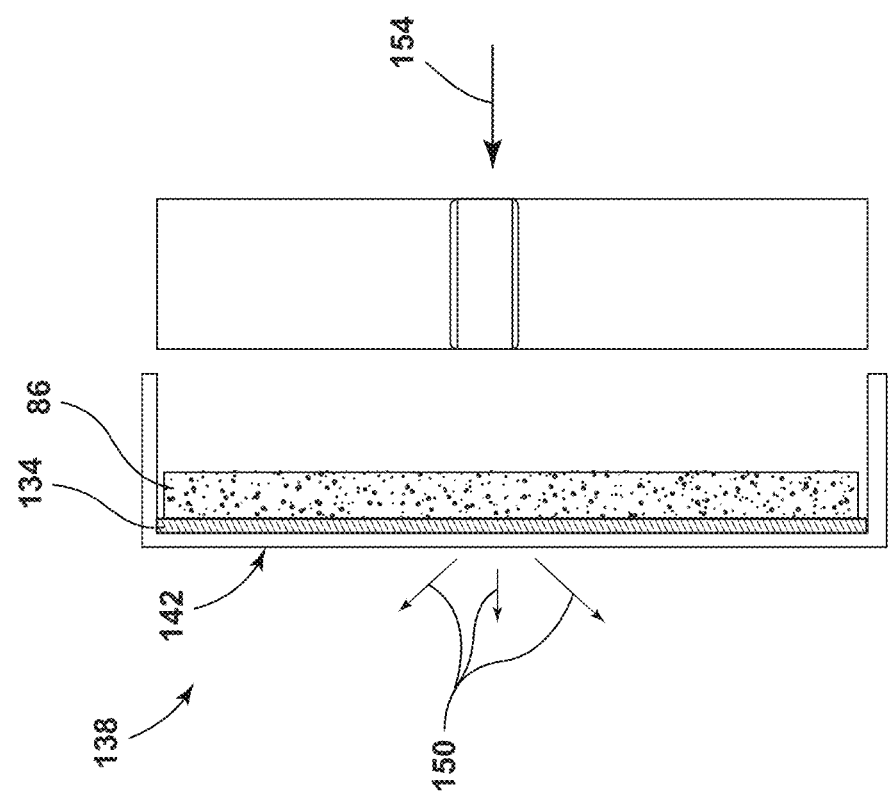
FIG. 5A is a schematic view of a tool that may be utilized in a molding process of producing the radiant panel, illustrating a first stage of the molding process, according to one aspect.

Referring now to FIGS. 5A-5D, an exemplary molding process is depicted. In various examples, the depicted molding process may be utilized for making radiant panels 38 that are harder, stiffer, or generally more rigid or may be used for producing radiant panels 38 that are softer, less hard, or less rigid. Areas within the cabin 14 of the vehicle 10 that may benefit from radiant panels 38 that are softer may include regions of the cabin 14 where an occupant will physically touch the radiant panel 38 on a regular basis. For example, having the radiant panel 38 be generally soft to the touch may be beneficial on the surfaces 42 of the seating assemblies 30, on the trim panels 46 of the doors 34, on the upper surface 54 of the center console 26, on the side surface 58 of the center console 26, on the handle portion 70 of the steering wheel 22, and/or on the headliner 74 of the cabin 14. Regions of the cabin 14 of the vehicle 10 where the occupant will not directly interact with the radiant panel 38 on a regular basis may be provided with a stiffer or harder radiant panel 38 to the touch. For example, the floorboard region 62, the underside 66 of the instrument panel 18, the headliner 74 of the cabin 14, and/or other suitable locations. The surface layer 78 and the first interior layer 82 of the radiant panel 38 may be coupled to one another prior to the molding process. The coupled surface layer 78 and first interior layer 82 may be referred to as a conductive composite sheet 134. The conductive composite sheet 134 may be inserted into a tool 138. The tool 138 includes a first mold 142 and a second mold 146. When the conductive composite sheet 134 is inserted into the tool 138, the second interior layer 86 may already be coupled to the conductive composite sheet 134. For example, the conductive composite sheet 134 and the second interior layer 86 may be coupled to one another by lamination or extrusion prior to insertion into the tool 138. A vacuum may be applied at the first mold 142, as indicated by arrows 150, in order to hold the conductive composite sheet 134 and the second interior layer 86 in place (see FIG. 5A). The second mold 146 is partially inserted into the first mold 142 as indicated by arrow 154 and the progression from FIG. 5A to FIG. 513. Once the second mold 146 is partially inserted into the first mold 142, as shown in FIG. 5B, a short metered shot of material may be deposited into the tool 138 by way of a channel 158 that is defined by the second mold 146. The material deposited into the tool 138 by way of the channel 158 may be a precursor material of the third interior layer 90. For example, the third interior layer 90 may be a foam layer. Accordingly, the foam of the third interior layer 90 may be injected into the tool 138 by way of the channel 158. Next, the tool 138 may be fully closed under pressure, which forces the precursor material of the third interior layer 90 to fill the tool 138. Additionally, the second interior layer 86 may be at least partially compressed upon the application of pressure (see FIG. 5C). The tool 138 may then be opened, as depicted in FIG. 5D, and the completed radiant panel 38 may be ejected from the tool 138. For example, the radiant panel 38 may be ejected from the tool 138 by use of compressed air or ejection pins, as indicated by arrows 162.

Figure 6:
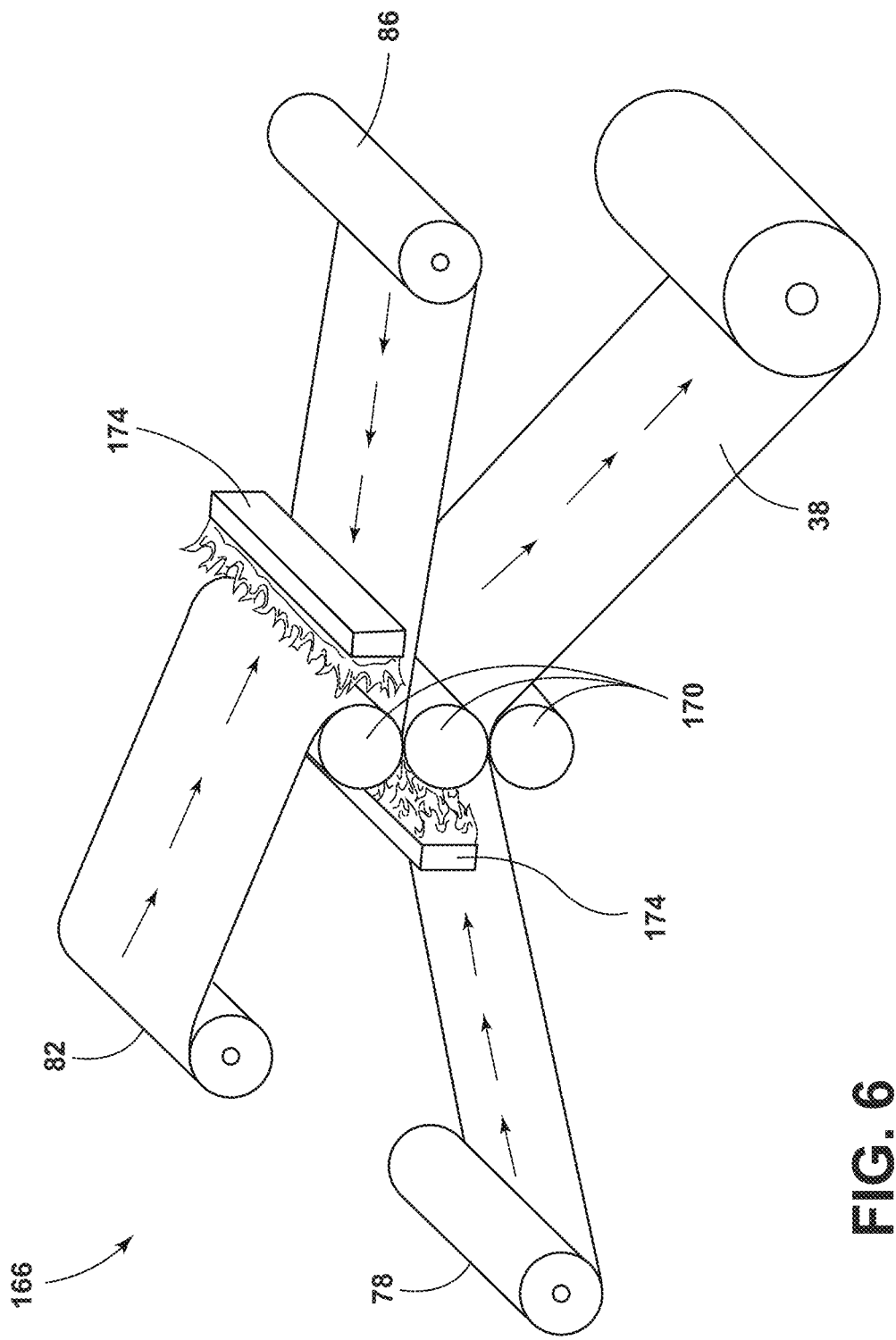
FIG. 6 is a schematic representation of a laminating process that may be utilized in the production of the radiant panel, according to one aspect.

Referring now to FIG. 6, as mentioned above, the surface layer 78 and the first interior layer 82 may be laminated together prior to formation of the second interior layer 86 and/or the third interior layer 90 being applied to the remaining layers to form the radiant panel 38. The surface layer 78, the first interior layer 82, the second interior layer 86, and/or the third interior layer 90 may each be formed into sheets and placed on large rolls for subsequent assembly into the radiant panel 38. For example, the surface layer 78, the first interior layer 82, and the second interior layer 86 may be arranged in a lamination process that can be executed on a laminator 166. The depicted example of FIG. 6 shows a tri-laminator. Each of the surface layer 78, the first interior layer 82, and the second interior layer 86 may be fed into a series of rollers 170 within the laminator 166. In some examples, the rollers 170 may be heated to a temperature sufficient to induce lamination between the various sheets or layers. In some examples, the laminator 166 may be provided with one or more coupling heads 174 that are utilized to couple the individual layers or sheets to one another. For example, the one or more coupling heads 174 may be adhesive heads that apply adhesive to adjacent surfaces of the individual layers (e.g., the surface layer 78, the first interior layer 82, and/or the second interior layer 86) such that the adjacent surfaces of the individual layers or sheets may be coupled to one another in the process of generating or producing the radiant panel 38. In various examples, the one or more coupling heads 174 may be heated heads, such as flame-producing heads, that ultimately heat the individual sheets or layers immediately prior to and/or during the interaction between the adjacent surfaces of the individual layers. Regardless of the particular arrangement of the laminator 166 with regard to heated rollers 170, adhesive coupling heads 174, or heated coupling heads 174, the rollers 170 may be arranged such that a pressure is applied to the plurality of sheets that will be running through the rollers 170 at any given moment. For example, an upper one of the rollers 170, as arranged in FIG. 6, that is utilized to couple the first interior layer 82 and the second interior layer 86 to one another may apply a pressure to the sheets of the first and second interior layers 82, 86 as they pass through the upper one of the rollers 170 and a middle one of the rollers 170. After passing between the upper one of the rollers 170 and the middle one of the rollers 170, as arranged in FIG. 6, the first and second interior layers 82, 86 may be coupled to one another and directed to pass between the middle one of the rollers 170 and a lower one of the rollers 170, as arranged in FIG. 6. The surface layer 78 may additionally be directed to pass between the middle roller 170 and lower roller 170, as arranged in FIG. 6, such that the surface layer 78 is coupled to the first interior layer 82 and the second interior layer 86, thereby resulting in a completed, or nearly completed, sheet of radiant panel 38 that can consequently be stored on a larger roll for further assembly into various components of the vehicle 10. The pressure applied by the individual rollers 170 may be accomplished by positioning the individual rollers 170 a distance away from one another that corresponds to less than a thickness of the number of sheets that would be passing between adjacent rollers 170. For example, the upper one of the rollers 170 and the middle one of the rollers 170 may be spaced apart a distance that is less than a summation of the thicknesses of the first interior layer 82 and the second interior layer 86. Similarly, the middle one of the rollers 170 and the lower one of the rollers 170 may be spaced apart a distance that corresponds to less than the summation of the thicknesses of the surface layer 78, the first interior layer 82, and the second interior layer 86.

Consumers are ever on the lookout for additional comfort features within a cabin 14 of the vehicle 10. One such comfort feature often sought by consumers is the ability to customize or control their own independent climate zones. However, preconditioning and maintaining climate comfort for the entirety of the cabin 14 can be less efficient than localized radiant heating, as provided by the radiant panel 38 of the present disclosure. Improving thermal conductivity of the panel can lead to an increase in the electrical conductivity of the panel as well. The radiant panels 38 of the present disclosure have accomplished an increase in a thermal conductivity of the surface layer 78, which the consumer interacts with directly or nearly directly, while maintaining a relatively low electrical conductivity for the surface layer 78. By maintaining a relatively low electrical conductivity of the surface layer 78, electrical energy applied to the first interior layer 82 by the power source 110 may be substantially confined to the first interior layer 82. Confining the electrical energy provided by the power source 110 to the first interior layer 82, which is intended to receive the electrical energy, can improve an overall efficiency of the radiant panel 38. The insulative properties provided by the second interior layer 86 and/or the third interior layer 90 coupled with the thermal conductivity of the surface layer 78 enables a directing of the thermal energy generated at the first interior layer 82 toward the consumer or occupant that is proximate to the surface layer 78 in the assembled cabin 14. The second interior layer 86 and/or the third interior layer 90 are also provided with varied degrees of rigidity which aid in controlling the stiffness of the radiant panel 38 in regions where a consumer will directly and routinely interact with the radiant panel 38. The radiant panels 38 of the present disclosure are capable of being made in a manner that maintains a supple or soft surface and/or appearance to the radiant panel 38 while enabling a more localized, efficient, and customizable climate zone for individual seating positions.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A radiant panel, comprising:
 a surface layer that is thermally conductive, the surface layer having an exterior surface and an interior surface;
 one or more channels provided in the surface layer;

a first interior layer that is electrically conductive, the first interior layer having an exterior surface and an interior surface, wherein the exterior surface of the first interior layer and the interior surface of the surface layer are coupled to one another;
a second interior layer having thermally insulative properties and a first rigidity, the second interior layer having an exterior surface and an interior surface, wherein the exterior surface of the second interior layer and the interior surface of the first interior layer are coupled to one another; and
a third interior layer having thermally insulative properties and a second rigidity, the third interior layer having an exterior surface and an interior surface, wherein the exterior surface of the third interior layer and the interior surface of the second interior layer are coupled to one another, wherein the second rigidity is greater than the first rigidity.

2. The radiant panel of claim 1, wherein the first interior layer receives electrical energy from a power source.

3. The radiant panel of claim 2, wherein the electrical energy received by the first interior layer is converted into thermal energy, and wherein the thermal energy is transmitted from the interior surface of the surface layer to the exterior surface of the surface layer.

4. The radiant panel of claim 3, wherein the insulative properties of the second interior layer and the third interior layer inhibit the thermal energy generated at the first interior layer from being transferred to the second interior layer and the third interior layer.

5. The radiant panel of claim 3, wherein the insulative properties of the second interior layer and the third interior layer provide a directional preference for dissipation of the thermal energy such that greater than 50% of the thermal energy generated at the first interior layer is transferred to the surface layer.

6. The radiant panel of claim 1, wherein the surface layer is electrically insulative.

7. The radiant panel of claim 1, wherein the surface layer has a thickness in the range of greater than zero millimeters and less than about one millimeter.

8. The radiant panel of claim 1, wherein the surface layer comprises boron nitride.

9. The radiant panel of claim 8, wherein the surface layer comprises boron nitride at a concentration between about 1% by weight of the surface layer to about 10% by weight of the surface layer.

10. The radiant panel of claim 9, wherein a thermal conductivity of the surface layer is between about 0.30 watt per meter-kelvin (W/(mK)) to about 0.50 watt per meter-kelvin (W/(mK)).

11. The radiant panel of claim 1, wherein the surface layer is a user-proximate surface within a cabin of a vehicle.

12. The radiant panel of claim 1, wherein the first interior layer comprises carbon nanostructures and graphene.

13. The radiant panel of claim 12, wherein the graphene within the first interior layer is present at a concentration of between about 1% by weight of the first interior layer to about 7% by weight of the first interior layer.

14. The radiant panel of claim 12, wherein the carbon nanostructures within the first interior layer are present at a concentration of between about 1% by weight of the first interior layer and about 5% by weight of the first interior layer.

15. A radiant panel, comprising:
a surface layer that is thermally conductive, the surface layer having an exterior surface and an interior surface, wherein the surface layer comprises boron nitride at a concentration of between about 1% by weight of the surface layer and about 10% by weight of the surface layer, and wherein a thickness of the surface layer is in the range of greater than zero millimeters and less than about one millimeter;
a first interior layer that is electrically conductive and receives electrical energy from a power source, the first interior layer having an exterior surface and an interior surface, wherein the exterior surface of the first interior layer and the interior surface of the surface layer are coupled to one another, wherein the first interior layer comprises carbon nanostructures and graphene, wherein the carbon nanostructures are present in the first interior layer at a concentration of between about 1% by weight of the first interior layer and about 5% by weight of the first interior layer, and wherein the graphene is present in the first interior layer at a concentration of between about 1% by weight of the first interior layer and about 7% by weight of the first interior layer;
a second interior layer having thermally insulative properties and a first rigidity, the second interior layer having an exterior surface and an interior surface, wherein the exterior surface of the second interior layer and the interior surface of the first interior layer are coupled to one another; and
a third interior layer having thermally insulative properties and a second rigidity, the third interior layer having an exterior surface and an interior surface, wherein the exterior surface of the third interior layer and the interior surface of the second interior layer are coupled to one another, wherein the second rigidity is greater than the first rigidity.

16. The radiant panel of claim 15, wherein a thermal conductivity of the surface layer is between about 0.30 watt per meter-kelvin (W/(mK)) to about 0.50 watt per meter-kelvin (W/(mK)).

17. The radiant panel of claim 15, wherein the surface layer is electrically insulative.

18. The radiant panel of claim 15, further comprising: one or more channels provided in the surface layer.

19. The radiant panel of claim 15, wherein the electrical energy received by the first interior layer is converted into thermal energy, and wherein the thermal energy is transmitted from the interior surface of the surface layer to the exterior surface of the surface layer.

20. The radiant panel of claim 19, wherein the insulative properties of the second interior layer and the third interior layer inhibit the thermal energy generated at the first interior layer from being transferred to the second interior layer and the third interior layer, and wherein the insulative properties of the second interior layer and the third interior layer provide a directional preference for dissipation of the thermal energy such that greater than 50% of the thermal energy generated at the first interior layer is transferred to the surface layer.

21. A radiant panel, comprising:
a surface layer that is thermally conductive, the surface layer having an exterior surface and an interior surface;
a first interior layer that is electrically conductive, the first interior layer having an exterior surface and an interior surface, wherein the first interior layer comprises carbon nanostructures and graphene, and wherein the exterior surface of the first interior layer and the interior surface of the surface layer are coupled to one another;

a second interior layer having thermally insulative properties and a first rigidity, the second interior layer having an exterior surface and an interior surface, wherein the exterior surface of the second interior layer and the interior surface of the first interior layer are coupled to one another; and a third interior layer having thermally insulative properties and a second rigidity, the third interior layer having an exterior surface and an interior surface, wherein the exterior surface of the third interior layer and the interior surface of the second interior layer are coupled to one another, wherein the second rigidity is greater than the first rigidity.

\* \* \* \* \*